United States Patent [19]

Cohen

[11] Patent Number: 4,721,930

[45] Date of Patent: Jan. 26, 1988

[54] SUSPENSION AND DRIVE SYSTEM FOR A MECHANICAL RF ENERGY POWER DIVIDER INTENDED FOR SPACECRAFT APPLICATIONS

[75] Inventor: Nathaniel L. Cohen, San Diego, Calif.

[73] Assignee: General Dynamics Corp., Space Systems Div., San Diego, Calif.

[21] Appl. No.: 868,924

[22] Filed: May 21, 1986

[51] Int. Cl.[4] ........................ H01P 5/12; B65H 59/10; F16F 1/14; B60T 13/04

[52] U.S. Cl. ........................................ 333/137; 188/67; 188/171; 267/154

[58] Field of Search ................. 188/67, 161, 158, 171, 188/173; 318/372; 333/137, 21 A, 81 B, 117, 125; 335/233, 248, 249, 262, 74, 75, 77, 86

[56] References Cited

U.S. PATENT DOCUMENTS

| | | | |
|---|---|---|---|
| 2,628,278 | 2/1953 | Zaleski | 333/21 A X |
| 2,922,917 | 1/1960 | Kompfner | 333/81 B X |
| 2,985,850 | 5/1961 | Crawford et al. | 333/81 B |
| 3,076,921 | 2/1963 | Hays | 318/372 X |
| 3,124,342 | 3/1964 | Ormond | 267/154 |

FOREIGN PATENT DOCUMENTS

| | | | |
|---|---|---|---|
| 0907717 | 10/1962 | United Kingdom | 188/171 |

*Primary Examiner*—Andres Kashnikow
*Assistant Examiner*—Robert J. Oberleitner
*Attorney, Agent, or Firm*—John R. Duncan; Frank D. Gilliam

[57] ABSTRACT

A suspension and drive system for a mechanical microwave power divider for spacecraft applications. The mechanical power divider includes a control which extends longitudinally therethrough. Torsion springs connect each end of the control rod to fixed surfaces and an electromagnetic control is coupled to the control rod to rotate it to a predetermined angular position. A selectively energizeable friction brake surrounds at least a portion of the control rod for holding it in a predetermined angular position.

16 Claims, 7 Drawing Figures

SUSPENSION AND DRIVE SYSTEM FOR A MECHANICAL RF ENERGY POWER DIVIDER INTENDED FOR SPACECRAFT APPLICATIONS

BACKGROUND OF THE INVENTION

1. Field of the Invention

This invention generally relates to an improvement in the field of suspensions and drive systems for variable power dividers for spacecraft, and more particularly but not by way of limitation to a mechanical arrangement that drives a microwave variable power divider to a predetermined position with minimum friction loss and holds it in such position until the position is to be changed.

2. Description of the Prior Art

This invention has as its main purpose the provision of an essentially friction free drive which has an inherently high reliability when used for a microwave mechanical variable power divider in spacecraft applications. In modern communications spacecraft, the antenna system typically includes a number of feed horns arranged in a predetermined array which may directly illuminate the earth, or may be used as a source to feed a parabolic reflector which illuminates the earth. By suitably energizing the elements of the array with the correct amounts of power, the beam or beams from the antenna system can provide small or large spots of either circular or non-circular shapes. Thus, the utilization of the radio frequency ("RF") energy that is available can be made more effective for communication purposes.

In practice, the adjustments of the power levels to the feed horns are made either by switches and fixed power dividers (which permit only a predetermined set of fixed radiation patterns) or by means of variable power dividers ("VPD") which permit a much higher degree of control of the beam patterns. The changes in the beam patterns are made by remote control from the earth whenever the system operator deems such changes to be appropriate. Thus, controllable and stable VPDs are essential elements of such systems.

In the past, VPDs have comprised ferrite devices which have the property of producing phase shift of signals in a microwave waveguide, the amount of shift being controlled by an externally applied magnetic field. In one embodiment these devices comprise a Faraday Rotator while in another, the phase shifters are used with microwave hybrid junctions to add or substract power in a controlled manner. Mechanical devices have also been proposed, but have not been accepted largely due to a question of reliability of bearings and drive mechanisms which may fail due to friction, loss of lubricant, sticking, and other problems associated with mechanical devices.

However, mechanical devices are generally considered to be superior in performance to the ferrite devices in that they can be expected to have lower RF losses and have inherently higher stability during temperature changes and with the passage of time. Further, when mechanical devices are properly designed, they need power only to change the state from one division ratio to another, a property not shared by some of the ferrite devices.

Accordingly, it is a purpose of this invention to provide a mechanical device which (i) virtually eliminates the friction commonly encountered in mechanical devices, and (ii) provides both a motive force arrangement to drive the VPD to a predetermined setting and a holding force which keeps it at that setting until it is to be changed again.

Prior art patents relating to electromagnetic brake arrangements include U.S. Pat. Nos. 4,066,152; 2,340,052; 2,312,077; 3,896,925; and 1,677,024 but none disclose the mechanical structure of the present invention that drives a VPD to a predetermined setting and holds it in such setting. U.S. Pat. No. 3,487,281 relates to electromagnetic circuitry for controlling the rotation of a rotor in a electric motor.

SUMMARY OF THE INVENTION

The present invention contemplates a suspension and drive system for a microwave power divider which includes a first orthomode transducer, a second orthomode transducer spaced from the first transducer and rotated a predetermined angular amount therefrom, a hollow circular waveguide coupling the first and second transducers, means to inject or extract RF energy into or from each transducer section, septum means positioned within the waveguide and variable to a predetermined configuration to control the polarization of RF energy flowing through the waveguide from one transducer to another, and a variable control rod extending longitudinally through the power divider for controlling the configuration of the septum means, said drive system also including torsion spring means connecting each end of the control rod to fixed surfaces positioned at each end of the power divider.

Selectively energizeable friction brake means surround at least a portion of the control rod for holding the control rod in a predetermined angular position and electric motor means are coupled to the control rod and are operable to rotate the control rod a predetermined angular amount.

This invention, as well as other features, objects and advantages thereof, will be readily apparent from consideration of the following detailed description relating to the accompanying drawings in which like reference characters designate like, or corresponding, parts throughout the several views, and wherein:

DETAILED DESCRIPTION OF THE DRAWINGS

Figure 1:
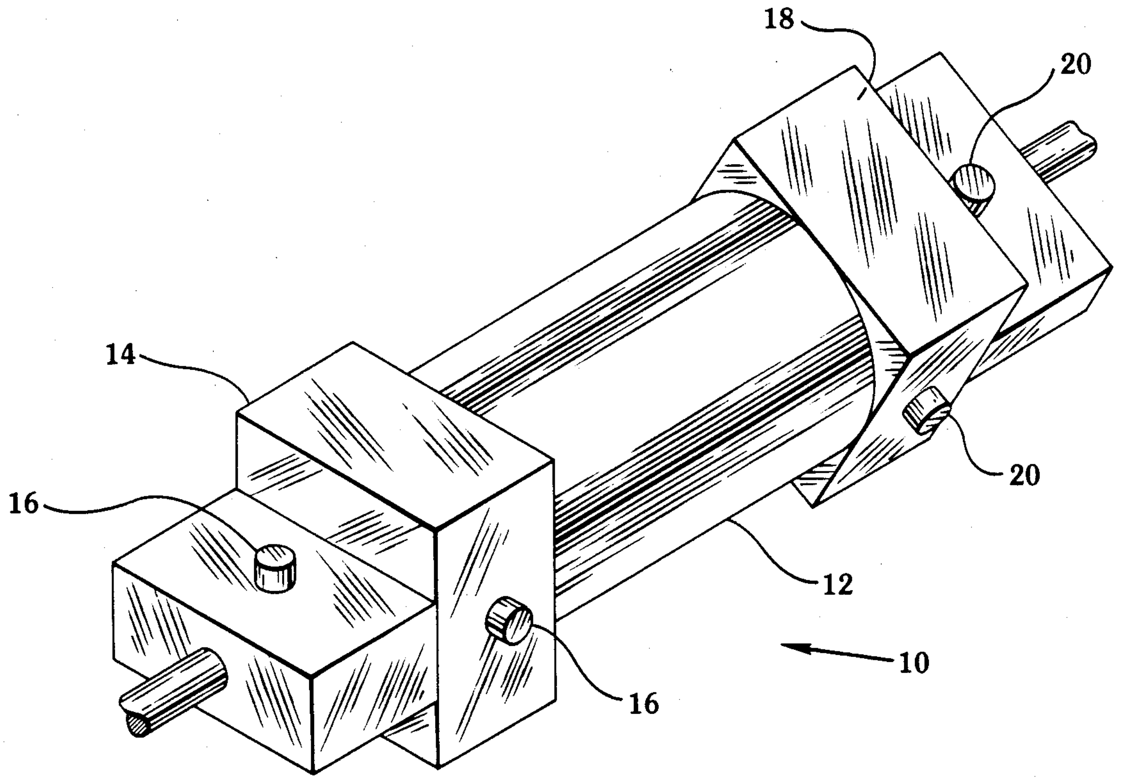
FIG. 1 is a perspective view of a variable microwave power divider which may advantageously used with the present invention.

Referring now to the drawings and in particular to FIG. 1, the reference character 10 designates a mechanical variable microwave power divider ("VPD") that may advantageously be used with the novel suspension and drive system of the instant invention. For a greater understanding of the VPD 10 reference is made to U.S. patent application, Ser. No. 06/835,404, filed Mar. 3, 1986, which disclosure is incorporated herein by reference.

The VPD 10 comprises a circular waveguide section 12 which has suitably connected to one end a first orthomode transducer 14 which is provided with suitable means 16 for injecting or extracting microwave energy. Connected to the other end of the waveguide section 12 in a suitable manner is a second orthomode transducer 18 which is rotated about the central axis of the VPD 10 a predetermined angle with respect to the first transducer 14 for a purpose that will be discussed in detail hereinafter. As with the first transducer 14, the second orthomode transducer 18 is provided with suitable means 20 for injecting or extracting microwave energy.

Figure 2:
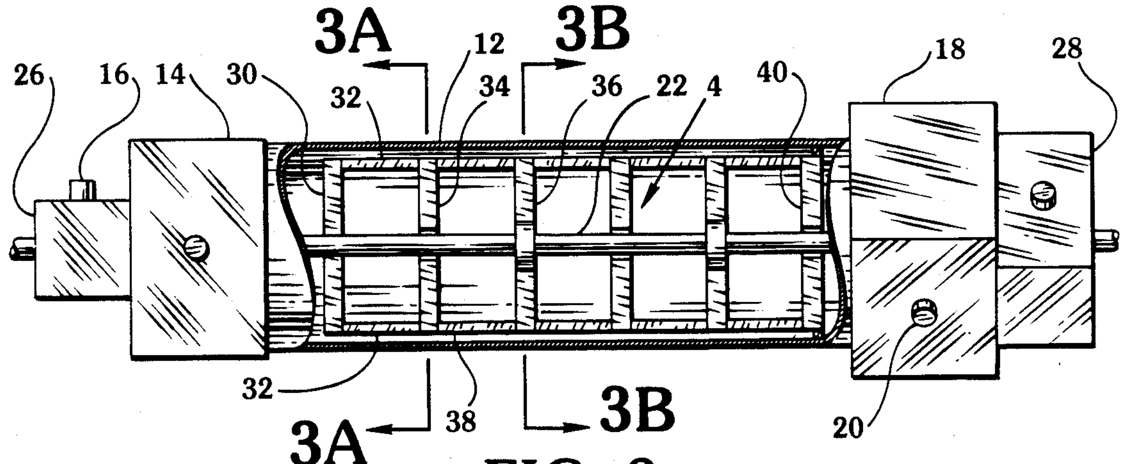
FIG. 2 is a partial cutaway side view of the variable microwave power divider of FIG. 1 that is equipped with the suspension and drive system of the instant invention.
Figure 3A:
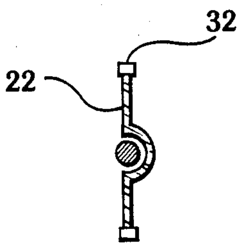
FIGS. 3A and 3B are detail sections taken along lines 3A—3A and 3B—3B in FIG. 2.
Figure 3B:
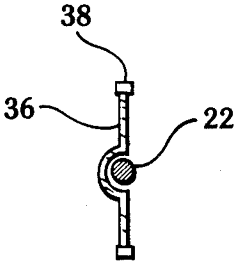
Figure 5:
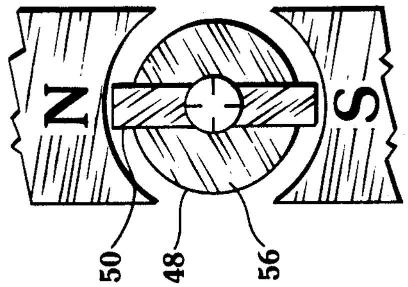
FIG. 5 is a section taken along lines 5—5 in FIG. 4.

Referring now to FIG. 2, it will be seen that a central control rod 22 extends longitudinally through the VPD and through bores 24 and 25 provided in end faces 26 and 28 of transducers 14 and 18 respectively. A suitable member 30 is connected to the rod 22 within the waveguide 12 and adjacent to the first transducer 14. The member 30 is connected through suitable spring members 32 to another member 34 that is not connected to the rod 22. Referring to FIG. 3A it will be seen how member 34 is connected to spring members 32 and has a centrally provided curved portion so as to avoid contact with the control rod 22. Another member 36 shaped similarly to member 34 is connected to member 34 through spring members 38. It will be seen in FIG. 3B that member 36 has its curved portion extending on the side opposite to that of member 34 and yet avoiding contact with control rod 22. A plurality of members connected similarly to members 34 and 36 are provided, which progression is terminated by a connection to member 40 which is suitably connected to the circular waveguide 12.

The connection of member 30 to member 40 provides a flat spring like member that is connected at one end to the control rod 22 and at the other end to the waveguide 12. Thus, if RF energy, such as microwave energy, is injected into VPD 10 at transducer 14, rotation of the rod a predetermined angle will twist the member so that microwave energy flowing through the waveguide 12 will be similarly rotated. The transducer 18 is connected to the waveguide 12 so that it will accept the microwave energy thus rotated. The energy then may be suitably extracted from the transducer 18 via ports 20.

Figure 4:
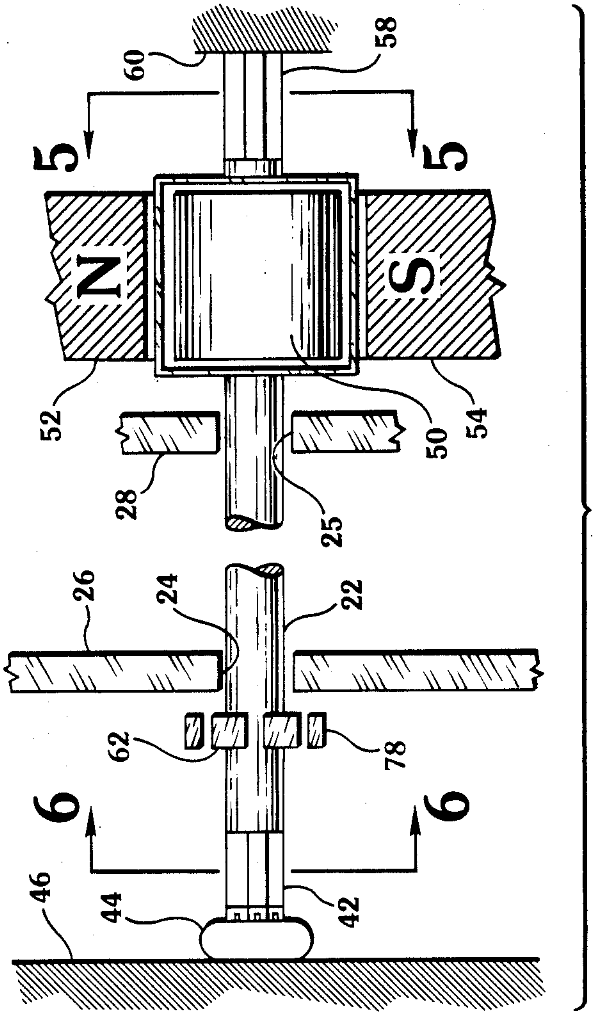
FIG. 4 is a partial side view of the novel suspension and drive system of the instant invention which illustrates how it is advantageously used with the variable power divider of FIG. 1.

Referring now to FIG. 4, the details of the novel drive and suspension system of the present invention will be disclosed. One end of the control shaft 22 has a plurality of longitudinally extending flat springs 42 attached to it. The flat springs 42 are attached to a spring member 44 that is suitably connected to a mounting surface 46. Thus, control rod 22 is mounted to the surface 46 in a manner that permits rotation and limited longitudinal movement. The spring 44 is intended to have great lateral resistance and to have sufficient action in the direction of the axis of the shaft 22 to maintain constant or near constant tension as the shaft 22 is rotated. It should be noted that rotation of the shaft 22 causes the springs 42 to twist relative to their spring 44 connection like springs 58 twist relative to surface 60, hereinafter discussed, acting as torsion springs to provided a restoring froce against rotation of the shaft 22. While FIG. 4 shows four springs 42 at each end, it is not intended that the invention be bound to that number. It is clear to those skilled in the art that as few as three or more equidistant spaced springs could maintain the axial position of the control rod with equal effectiveness.

The other end of control rod 22 has secured to it a bobbin 48 on which is wound a suitable coil 50. Arranged around the bobbin 48 is a magnet with N and S poles 52 and 54 respectively, and within the bobbin 48 is a soft magnetic material 56 which provides a good magnetic path.

The bobbin 48 is connected through a plurality of longitudinally extending flat springs 58 to a suitable reference surface 60. The attachment of the springs 58 to the structural member 60 may be made of insulating material so that the current to the coil 50 may be passed through two of the springs 58 thereby avoiding any "pigtail leads." In any event the specific electrical connections to the coil 50 are a matter of choice and are well within those skilled in the art. Specific electrical connections to the coil 50 have been omitted for ease of illustration. Passing an electric current through the coil 50 wound on the bobbin 48 causes rotation of the shaft 22 by an amount proportional to the current.

As the control shaft 22 rotates the torsion springs 42 and 58 twist tending to shorten in the axial direction, which shortening is compensated by spring 44. The lateral stiffness of the springs 42 and 58 retain the shaft 22 in its proper axial position. As described in detail in the referenced disclosure, the total rotational excursion of the control rod 22 need never exceed 90 degrees. In consequence, continuous rotation is not required.

The suspension means and means to rotate the control rod having been described in detail, the means to hold the control rod 22 in a predetermined rotational position will be described.

Figure 6:
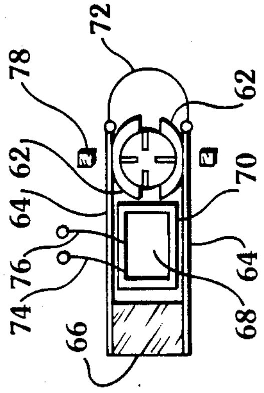
FIG. 6 is a section taken along lines 6—6 in FIG. 4.

Referring to FIGS. 4 and 6, it will be seen that brake shoes 62 normally partially surround control shaft 22 and grip it so as to preclude it from rotating from a predetermined position. The opposed shoes 62 are mounted on spring 64 which are fixed at one end to a block 66. The springs 64 and the block 66 are conductive.

Between the spaced spring members 64 is positioned a block 68 of magnetic material on which is wound a suitable coil 70. The free ends of the spring members 64 are electrically connected by a lead 72 to form a short circuit loop around coil 70. When an alternating current is passed through coil 70 through leads 74 and 76, a large current is electromagnetically induced in the loop comprising springs 64, block 66 and lead 72. This current causes self repulsion and the springs 64 move outwardly and lift the attached brake shoes 62 out of seizing contact with control shaft 22. Stops 78 limit the outward motion of the springs 64 during repulsion to insure that any unbalance in the strength of the two springs 64 does not result in one of them havig all the motion and leaving the other brake shoe 62 still resting on shaft 22. The presence of the stops 78 insures that both will ultimately move under the influence of the current. It is to be noted that the use of the AC transformer feature is intended to be exemplary, and that either AC or DC current could be passed directly through the spring members 64 to attain the same effect by disconnecting lead 72 and replacing it with a current source, for example.

It will be apparent that in use, an appropriate current is applied to coil 50 to rotate the flat member, formed by elements 30 through 40, to a desired position and direct microwave energy entering transducer 14 to the transducer 18 and thereby permit energy to be extracted from ports 20 in a desired ratio. The brake release current caused to flow and release the rod 22 is shut off thereby permitting the brake shoes 62 to grippingly engage the rod 22. The current to coil 50 is then shut off leaving the control rod 22 seized in a predetermined rotation position.

Changes may be made in the combination and arrangement of parts or elements as heretofore set forth in the specification and shown in the drawings, it being understood that changes may be made in the embodiments disclosed without departing from the spirit and scope of the invention as defined in the following claims.

What is claimed is:

1. A suspension and drive system for a variable microwave power divider including a first orthomode transducer means, a second orthomode transducer means spaced from the first transducer means and rotated a predetermined angular amount therefrom, a hollow circular waveguide means coupling the first and second transducer means, means to inject and extract RF energy into and from each transducer means, septum means positioned within the waveguide means and variable to a predetermined configuration to control the polarization of RF energy flowing through the waveguide means from one transducer means to another, and variable control rod means extending longitudinally through the power divider for controlling the configuration of the septum means, said system comprising:

torsion spring means connecting each end of the control rod means to fixed surfaces, selectively energizeable friction brake means surrounding at least a portion of the control rod means for holding the control rod means in a predetermined angular position, and electric motor means coupled to the control rod means and operable to rotate the control rod means a predetermined angular amount.

2. The suspension and drive system of claim 1 wherein the torsion spring means includes a plurality of longitudinally extending torsion spring members which are coupled to said fixed surfaces at each end of the control rod means.

3. The suspension and drive system of claim 2 wherein the torsion spring means further includes flat spring means connected between one of the fixed surfaces and one of said plurality of torsion spring members longitudinally extending from one end of the control rod means whereby when the control rod means is rotated to a predtermined angular position thereby causing a foreshortening of the axial length of said torsion members the flat spring extends in the axial direction of the control rod means to maintain the control rod means in its proper axial position.

4. The suspension and drive system of claim 3 wherein the torsion spring members comprise four equidistantly spaced apart members that are fixed to an end of the control rod means and to said fixed surfaces.

5. The suspension and drive system of claim 3 wherein the torsion spring members further includes at least three equidistantly spaced apart members that are fixed at one end to one end of the control rod means and at the other end to the flat spring means, the flat spring means being connected to said one of the fixed surfaces.

6. The suspension and drive system of claim 1 wherein the friction brake means includes a pair of accurate brake shoes that are biased into frictional contact with the control rod means to hold it in a predeterminable angular position against any torsional force exerted by the torsion spring means, said brake shoes being selectively electromagnetically lifted from frictional engagement with the control rod means to permit such control rod means to be rotated to a predetermined angular position.

7. The suspension and drive system of claim 6 wherein the friction brake means further includes a conductive spring member biasing each shoe into contact with the control rod means, each conductive spring member being electrically coupled to and spaced apart from the other conductive spring member and electromagnetic means being selectively energizeable to draw the conductive spring members away from the control rod means and the brake shoe carried by such spring members away from gripping engagement with the control rod means.

8. The suspension and drive system of claim 7 wherein the friction brake means includes a stop member spaced a predetermined distance from each conductive spring member so that when the electromagnetic means is energized an electric current is induced in an electrical circuit which includes the conductive spring members so as to cause each such conductive spring member to be repulsively biased away from the control rod means and into contact with stop member thereby ensuring that any unbalance in the strength of such conductive spring members does not result in one such conductive spring member having all the motion and leaving the other brake shoe still in contact with the control rod means.

9. The suspension and drive system of claim 8 wherein a flexible conductor connects the ends of the conductive spring members and a conductive member connects the opposing pair of ends of the conductive spring members into a conductive circuit.

10. The suspension and drive system of claim 1 wherein the electrical circuit which includes the torsion spring means is energized by alternating current.

11. The suspension and drive system of claim 10 wherein the electrical circuit which includes the torsion spring means is energized by direct current.

12. The suspension and drive system of claim 11 wherein the electric motor means coupled to the control rod means includes a motor core positioned concentrically on the control rod means.

13. The suspension and drive system of claim 12 wherein the motor core includes a bobbin upon which an electromagnetic coil is wound.

14. The suspension and drive system of claim 13 wherein the bobbin includes a soft magnetic material which provides a good magnetic path.

15. The suspension and drive system of claim 14 wherein the electric motor means includes opposing accurate N and S magnetic poles.

16. The suspension and drive system of claim 15 wherein electrical current is supplied to the coil wound around the bobbin through electrical leads placed on the adjacent conductive spring members.

* * * * *